United States Patent
Park et al.

(10) Patent No.: US 9,263,765 B2
(45) Date of Patent: Feb. 16, 2016

(54) CYCLOTRIPHOSPHAZENE COMPOUND, METHOD OF PREPARING THE SAME, ELECTROLYTE FOR LITHIUM SECONDARY BATTERY INCLUDING THE CYCLOTRIPHOSPHAZENE COMPOUND, AND LITHIUM SECONDARY BATTERY INCLUDING THE ELECTROLYTE

(71) Applicant: SAMSUNG SDI CO., LTD., Yongin-si, Gyeonggi-do (KR)

(72) Inventors: Young Sam Park, Yongin-si (KR); Ho-Seok Yang, Yongin-si (KR); Yun-Hee Kim, Yongin-si (KR); Jin-Hyeok Lim, Yongin-si (KR); Hee-Yeon Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 228 days.

(21) Appl. No.: 14/139,801

(22) Filed: Dec. 23, 2013

(65) Prior Publication Data

US 2014/0178752 A1 Jun. 26, 2014

(30) Foreign Application Priority Data

Dec. 24, 2012 (KR) .................. 10-2012-0152496
Dec. 12, 2013 (KR) .................. 10-2013-0154843

(51) Int. Cl.
*H01M 10/0567* (2010.01)
*H01M 10/052* (2010.01)
(Continued)

(52) U.S. Cl.
CPC ....... *H01M 10/0567* (2013.01); *C08G 59/4071* (2013.01); *H01M 10/052* (2013.01); *H01M 10/0568* (2013.01); *Y02E 60/122* (2013.01)

(58) Field of Classification Search
CPC .................. H01M 10/0567; H01M 10/052
USPC ................................. 429/200; 558/386
See application file for complete search history.

(56) References Cited

U.S. PATENT DOCUMENTS 4,107,108 A    8/1978   Dieck et al.
5,830,600 A    11/1998  Narang et al.
(Continued)

FOREIGN PATENT DOCUMENTS

JP    2009-245828 A    10/2009
KR    2000-0015946 A    3/2000

OTHER PUBLICATIONS

Patent Abstracts of Japan and English Machine Translation for JP 2009-245828 A listed above, 44 pages.
(Continued)

*Primary Examiner* — Stewart Fraser
*Assistant Examiner* — Rachel L Zhang
(74) *Attorney, Agent, or Firm* — Lewis Roca Rothgerber Christie LLP

(57) ABSTRACT

A cyclotriphosphazene compound comprising a fluorinated cyclotriphosphazene compound having at least one fluorine atom substituted with a group represented by Formula 1 below, a method of preparing the cyclotriphosphazene compound, an electrolyte including the cyclotriphosphazene compound, and a lithium secondary battery including the electrolyte are provided:

*A-[B—CN]$_x$    [Formula 1]

A being a heteroatom having an unshared electron pair; * representing a binding site for bonding the group represented by Formula 1 to a phosphorus (P) atom of the fluorinated cyclotriphosphazene compound; B being a substituted or unsubstituted C1-C5 alkylene group; and x being 1 or 2.

16 Claims, 1 Drawing Sheet

(51) Int. Cl.
   *C08G 59/40*    (2006.01)
   *H01M 10/0568*  (2010.01)

(56) References Cited

U.S. PATENT DOCUMENTS 6,455,200 B1    9/2002   Prakash et al.
2012/0107697 A1*  5/2012   Roh .................. H01M 10/0525
                                                     429/330

OTHER PUBLICATIONS

Abu-Lebdeh., et al. "New electrolytes based on glutaronitrile for high energy/power Li-ion batteries," Journal of Power Sources 189 (2009), pp. 576-579.

Fei, et al., "Methoxyethoxyethoxyphosphazenes as ionic conductive fire retardant additives for lithium battery systems," Journal of Power Sources 195 (2010), pp. 2082-2088.

* cited by examiner

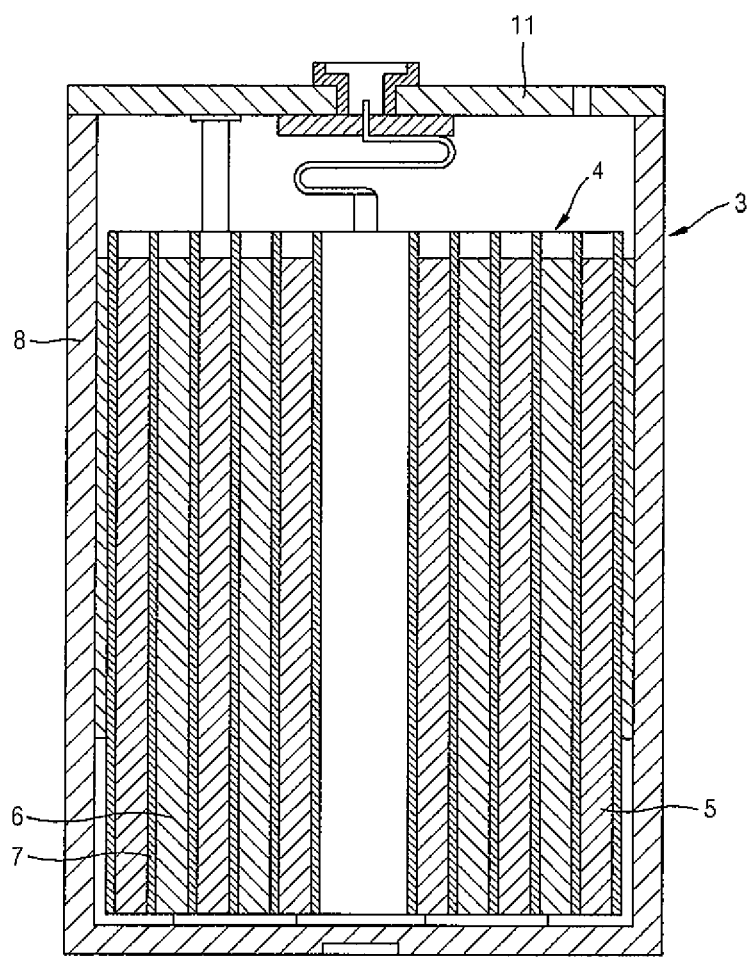

CYCLOTRIPHOSPHAZENE COMPOUND, METHOD OF PREPARING THE SAME, ELECTROLYTE FOR LITHIUM SECONDARY BATTERY INCLUDING THE CYCLOTRIPHOSPHAZENE COMPOUND, AND LITHIUM SECONDARY BATTERY INCLUDING THE ELECTROLYTE

CROSS-REFERENCE TO RELATED APPLICATION

This application claims priority to and the benefit of Korean Patent Application No. 10-2012-0152496, filed on Dec. 24, 2012 in the Korean Intellectual Property Office; and Korean Patent Application No. 10-2013-0154843, filed on Dec. 12, 2013 in the Korean Intellectual Property Office, the entire disclosures of each of which are incorporated herein by reference.

BACKGROUND

1. Field

One or more embodiments of the present invention relate to a cyclotriphosphazene compound, a method of preparing the same, an electrolyte for lithium secondary batteries including the same, and a lithium secondary battery including the electrolyte.

2. Description of the Related Art

Recently, lithium batteries (e.g., lithium secondary batteries) have drawn significant attention as power sources for small portable electronic devices. Lithium batteries including an organic electrolyte have a discharge voltage that is about twice as high as lithium batteries using an aqueous alkali electrolyte, and have a high energy density. A lithium secondary battery can be manufactured by injecting electrolyte into a battery cell including a positive electrode and a negative electrode, which include positive and negative active materials, respectively, allowing intercalation and deintercalation of lithium ions.

However, currently available lithium secondary batteries are not satisfactory in terms of safety, resistance to flame (e.g., fire), and lifetime characteristics, and thus, there is still a demand for further improvement in this regard.

SUMMARY

Aspects of one or more embodiments are directed toward a novel cyclotriphosphazene compound and a method of preparing the same.

Aspects of one or more embodiments are directed toward an electrolyte for lithium secondary batteries including the cyclotriposphazene compound to have improved (e.g., enhanced) stability.

Aspects of one or more embodiments are directed toward a lithium secondary battery including the electrolyte to have improved stability and ion conductivity.

Additional aspects will be set forth in part in the description which follows and, in part, will be apparent from the description, or may be learned by practice of the presented embodiments.

According to one or more embodiments of the present invention, there is provided a cyclotriphosphazene compound including a fluorinated cyclotriphosphazene compound having at least one fluorine atom substituted by a group represented by Formula 1 below:

*A-[B—CN]$_x$     [Formula 1]

wherein, in Formula 1, A is a heteroatom having an unshared electron pair; * indicates (e.g., represents) a binding site for bonding the group represented by Formula 1 to a phosphorus (P) atom of the fluorinated cyclotriphosphazene compound;

B is a substituted or unsubstituted C1-C5 alkylene group; and

X is 1 or 2.

According to one or more embodiments of the present invention, an electrolyte for a lithium secondary battery includes: a lithium salt; a nonaqueous organic solvent; and the above-described cyclotriphosphazene compound.

According to one or more embodiments of the present invention, a lithium secondary battery includes: a positive electrode; a negative electrode; and the above-described electrolyte.

According to one or more embodiments of the present invention, a method of preparing the above-described cyclotriphosphazene compound includes reacting a compound represented by Formula 6 below and hexafluorocyclotriphosphazene:

AH—[B—CN]$_x$     [Formula 6]

wherein, in Formula 6, A is a heteroatom having an unshared electron pair;

B is a substituted or unsubstituted C1-C5 alkylene group; and

X is 1 or 2.

In one embodiment, a cyclotriphosphazene compound is represented by Formula 10:

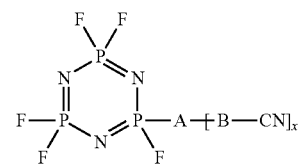

[Formula 10]

A of Formula 10 being a heteroatom having an unshared electron pair; B being a substituted or unsubstituted C1-C5 alkylene group; and x being 1 or 2.

BRIEF DESCRIPTION OF THE DRAWING

These and/or other aspects will become apparent and more readily appreciated from the following description of the embodiments, taken in conjunction with the accompanying drawing Here, the accompanying drawing is a schematic view of a lithium secondary battery according to an embodiment of the present invention.

DETAILED DESCRIPTION

Reference will now be made in more detail to embodiments, an example of which is illustrated in the accompanying drawing, wherein like reference numerals refer to the like elements throughout. In this regard, the present embodiments may have different forms and should not be construed as being limited to the descriptions set forth herein. Accordingly, the embodiments are merely described below, by referring to the FIGURE, to explain aspects of the present description. As used herein, the term "and/or" includes any and all combinations of one or more of the associated listed items.

Expressions such as "at least one of," when preceding a list of elements, modify the entire list of elements and do not modify the individual elements of the list. Also, in the context of the present application, when a first element is referred to as being "on" a second element, it can be directly on the second element or be indirectly on the second element with one or more intervening elements interposed therebetween.

According to an embodiment of the present invention, a cyclotriphosphazene compound includes (or is) a fluorinated cyclotriphosphazene compound having at least one fluorine being substituted by a group represented by Formula 1 below:

   [Formula 1]

In Formula 1, A is a heteroatom having an unshared electron pair; * indicates (e.g., represents) a binding site with a phosphorus (P) atom of the fluorinated cyclotriphosphazene compound (e.g., a binding site for bonding the group represented by Formula 1 to a P atom of the fluorinated cyclotriphosphazene compound); B is a substituted or unsubstituted C1-C5 alkylene group; and x is 1 or 2.

For example, the cyclotriphosphazene may be represented by Formula 10:

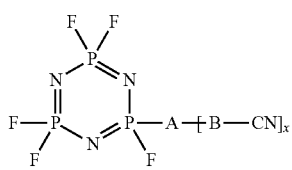   [Formula 10]

In Formula 10, A is a heteroatom having an unshared electron pair; B is a substituted or unsubstituted C1-C5 alkylene group; and x is 1 or 2.

In some embodiments, A in Formula 1 or 10 may be a nitrogen or oxygen atom.

The substituted or unsubstituted C1-C5 alkylene group maybe a methylene group, an ethylene group, a propylene group, a butylene group, or a pentylene group.

The group represented by Formula 1 above may be a group represented by Formula 1a or Formula 1b below.

   [Formula 1a]

In Formula 1a, n is an integer in a range of 1 to 5.

   [Formula 1b]

In Formula 1 b, n is an integer in a range of 1 to 5.

In Formula 1a and Formula 1b, * indicates (e.g., represents) a binding site with phosphorous (P) atom of the fluorinated cyclotriphosphazene compound (e.g., a binding site for bonding the group represented by Formulae 1a or 1b to a P atom of the fluorinated cyclotriphosphazene compound).

Examples of the cyclotriphosphazene compound described herein include novel compounds having high phosphorous content and improved resistance to reduction. The cyclotriphosphazene compound may be used as an anti-flame agent in preparing an electrolyte for lithium secondary batteries for preventing or reducing thermal runaway of the battery.

The cyclotriphosphazene compound includes a P=N group and a —C≡N group, which may coordinate (e.g., bond to) a transition metal of a positive active material, and thereby the cyclotriphosphazene compound may act as a positive electrode additive. As a result, addition of the cyclotriphosphazene compound to a lithium secondary battery leads to improved performance and stability of the lithium secondary battery, for example, through improvement in stability to oxidation of the electrolyte, suppression of side reactions at an interface of a positive electrode and thickness expansion of the electrolyte (e.g., reduced thickness expansion of the electrolyte). The cyclotriphosphazene compound may also prevent (or reduce the likelihood of) an open circuit voltage failure by reacting with a metal leaked from the positive electrode to the electrolyte. A degree of coordination of the cyclotriphosphazene compound to the positive active material may be adjusted by varying the number of cyano groups in the cyclotriphosphazene compound.

In some embodiments, the cyclotriphosphazene compound may be a compound represented by Formula 2 or a compound represented by Formula 3 below:

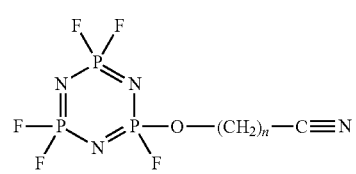   [Formula 2]

In Formula 2, n is an integer in a range of 1 to 5.

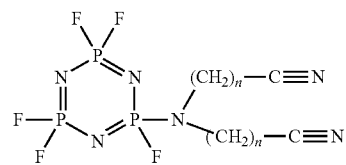   [Formula 3]

In Formula 3, n is an integer in a range of 1 to 5.

In some other embodiments, n in Formula 2 may be an integer in a range of 1 to 4, and n in Formula 3 may be an integer of 1 or 2.

In some embodiments, the cyclotriphosphazene compound may be a compound represented by Formula 4 or a compound represented by Formula 5 below:

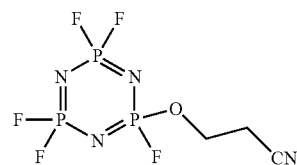   [Formula 4]

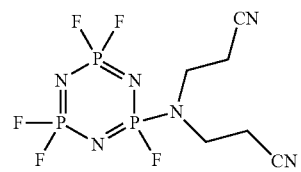   [Formula 5]

The cyclotriphosphazene compound may be a reaction product of a compound represented by Formula 6 below and hexafluorocyclotriphosphazene, which may be reacted with one another in the presence of a solvent.

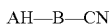   [Formula 6]

In Formula 6, A is a heteroatom having an unshared electron pair; and B is a substituted or unsubstituted C1-C5 alkylene group.

For example, in Formula 6, A may be a nitrogen (N) or oxygen (O) atom.

The compound of Formula 6 above may be a compound represented by Formula 7 or a compound represented by Formula 8 below:

HN—[—(CH$_2$)$_n$—C≡N]$_2$   [Formula 7]

In Formula 7, n is an integer in a range of 1 to 5.

HO—(CH$_2$)$_n$—C≡N   [Formula 8]

In Formula 8, n is an integer in a range of 1 to 5.

An amount of the compound of Formula 6 relative to the hexafluorocyclotriphosphazene may be in a range of about 1.0 mole to about 6.1 moles based on 1 mole of the hexafluorocyclotriphosphazene. For example, to obtain the compound of Formula 4 or the compound of Formula 5, about 1 mole to about 1.1 mole of the compound of Formula 6 may be used with respect to 1 mole of the hexafluorocyclotriphosphazene.

The reaction of the compound of Formula 6 above with the hexafluorocyclotriphosphazene in the presence of the solvent may be performed, for example, under reflux.

The hexafluorocyclotriphosphazene may be prepared from a reaction involving hexachlorocyclotriphosphazene, sodium fluoride, and a solvent.

An amount of the sodium fluoride relative to the amount of the hexachlorocyclotriphosphazene may be in a range of about 7.0 moles to about 7.1 moles based on 1 mole of the hexachlorocyclotriphosphazene. The solvent may be, for example, acetonitrile.

The hexachlorocyclotriphosphazene may be prepared from a reaction involving ammonium chloride, phosphorous pentachloride, zinc chloride, and a solvent. This reaction may be performed under reflux. The solvent may be, for example, monochlorobenzene.

An amount of the zinc chloride relative to the amount of the phosphorous pentachloride may be in a range of about 0.005 mole to about 0.03 mole based on 1 mole of the phosphorous pentachloride, but the amount is not specifically limited thereto.

An amount of the ammonium chloride relative to the amount of the phosphorous pentachloride may be in a range of about 1.0 mole to about 1.1 mole based on 1 mole of the phosphorous pentachloride, but the amount is not specifically limited thereto.

The reaction involving the ammonium chloride, phosphorous pentachloride, zinc chloride, and solvent may be performed at a temperature in a range of about 100° C. to about 150° C.

As an example of a synthesis method, the compound of Formula 2 (e.g., the compound of Formula 4) and the compound of Formula 3 (e.g., the compound of Formula 5), as examples of the cyclotriphosphazene compound, may be synthesized according to Reaction Scheme 1 below.

As illustrated in Reaction Scheme 1 below, the compound of Formula 4 or the compound of Formula 5 may be easily synthesized from phosphorous chloride and ammonium chloride as starting materials through three reaction steps.

[Reaction Scheme 1]

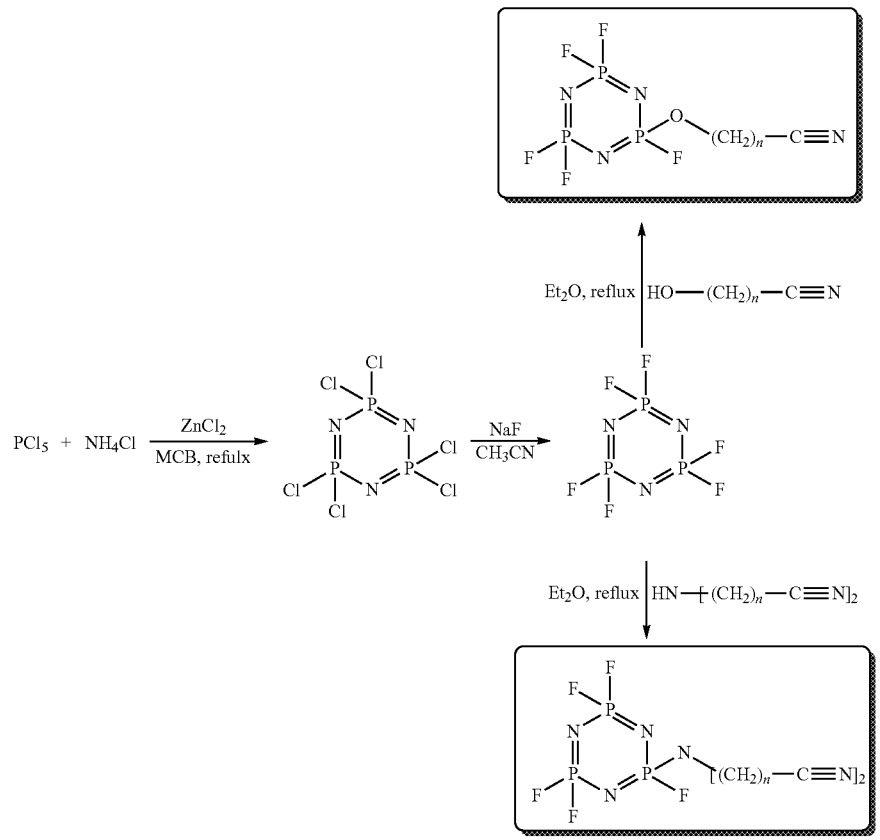

In Reaction Scheme 1, when n is 2 the compound of Formula 2 corresponds to the compound of Formula 4 and the compound of Formula 3 corresponds to the compound of Formula 5, $Et_2O$ indicates (e.g., represents) ether, $CH_3CN$ indicates (e.g., represents) acetonitrile, and MCB is an abbreviation of monochlorobenzene.

Unless specified otherwise, the term "substituted alkylene group" refers to a group of which at least one hydrogen atom of the alkylene group is substituted with a halogen atom, a hydroxy group, a C1-C20 alkyl group, a C2-C20 alkenyl group, a C2-C20 alkynyl group, a C1-C20 alkoxy group, a C3-C30 cycloalkyl group, a C3-C30 cycloalkenyl group, a C3-C30 cycloalkynyl group, a C2-C30 heterocycloalkyl group, a C2-C30 heterocycloalkenyl group, a C2-C30 heterocycloalkynyl group, a C6-C30 aryl group, a C6-C30 aryloxy group, a C2-C30 heteroaryl group, an amine group (e.g., —NR'R", wherein R' and R", which may be identical to or differ from each other, are each independently a hydrogen atom, a C1-C20 alkyl group, or a C6-C30 aryl group), an ester group (e.g., —COOR'", wherein R'" is a hydrogen atom, a C1-C20 alkyl group, or a C6-C30 aryl group), a carboxyl group (—COOH), a nitro group (—NO2), or a cyano group (—CN).

According to another embodiment of the present invention, an electrolyte for lithium secondary batteries includes a lithium salt, a nonaqueous organic solvent, and the above-described cyclotriphosphazene compound.

When using the electrolyte including the cyclotriphosphazene compound, a lithium secondary battery may have improved safety against overcharge, and improved conductivity and lifetime characteristics.

The lithium salt is dissolved in the nonaqueous organic solvent and serves as a source of lithium ions in a lithium secondary battery, thereby enabling the basic operation of the lithium secondary battery. The lithium salt also facilitates the migration of lithium ions between the positive electrode and the negative electrode.

Non-limiting examples of the lithium salt include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ (where x and y are natural numbers), or a combination thereof.

A concentration of the lithium salt may be in a range of about 0.1M to about 2.0M. When the concentration of the lithium salt is within the foregoing range, the electrolyte may have suitable (e.g., be appropriate) in conductivity and viscosity, and thus may have improved performance with the ability to effectively migrate lithium ions.

The nonaqueous organic solvent serves as a migration medium of ions involved in electrochemical reactions in batteries.

The nonaqueous organic solvent may be a carbonate-based solvent, an ester-based solvent, an ether-based solvent, a ketone-based solvent, an alcohol-based solvent, an aprotic solvent, or a combination thereof.

The carbonate-based compound may be a chain carbonate compound, a cyclic carbonate compound, or a combination thereof.

Non-limiting examples of the chain carbonate compound include diethyl carbonate (DEC), dimethyl carbonate, (DMC), dipropyl carbonate (DPC), methylpropyl carbonate (MPC), ethylpropylcarbonate (EPC), methylethyl carbonate (MEC), or a combination thereof. Non-limiting examples of the cyclic carbonate compound include ethylene carbonate (EC), propylenecarbonate (PC), butylene carbonate (BC), fluoroethylene carbonate (FEC), vinylethylene carbonate (VEC), and a combination thereof.

The carbonate-based compound may include more than about 60 wt % of a chained carbonate compound and less than about 40 wt % of a cyclic carbonate compound. When the chain carbonate compound and the cyclic carbonate compound are used within the foregoing ranges, the nonaqueous organic solvent may have a high dielectric constant and a small viscosity.

Non-limiting examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Non-limiting examples of the ether-based compound include dibutyl ether, tetraglyme, diglyme, dimethoxyethane, 2-methyltetrahydrofuran, and tetrahydrofuran. An example of the ketone-based compound is cyclohexanone. Non-limiting examples of the alcohol-based solvent include ethyl alcohol and isopropyl alcohol.

The nonaqueous organic solvent may be used alone or in a combination of at least two. In the latter, a mixing ratio of the at least two nonaqueous organic solvents may be appropriately adjusted depending on a desired performance of the battery.

The electrolyte may further include succinonitrile as an additive. An amount of the succinotrile may be in a range of about 0.1 parts to about 5 parts by weight, and in some embodiments, in a range of about 0.5 parts to about 3 parts by weight, based on 100 parts by weight of a total weight of the electrolyte. When further added into the electrolyte, the succinonitrile may form a coordinate bond (or dative bond) with a transition metal in a positive active material on an interface with the positive electrode, and thus suppress (or reduce the likelihood of) a failure in open circuit voltage (OCV) during a formation process, and improve high-temperature stability when exposed to heat.

In some embodiments, the electrolyte may further include 1,3-propane sultone. An amount of the 1,3-propane sultone may be in a range of about 0.1 part to about 10 parts by weight based on 100 parts by weight of a total weight of the electrolyte. When further including the 1,3-propane sultone, the electrolyte may lead to improved charge/discharge characteristics and cycling characteristics.

Hereinafter, a lithium secondary battery including the above-described electrolyte, according to an embodiment of the present invention, will be described with reference to the accompanying drawing.

The accompanying drawing is a schematic view of a lithium secondary battery 3 according to an embodiment of the present invention.

Referring to the accompanying drawing, the lithium secondary battery 3 as a rectangular battery includes a positive electrode 5, a negative electrode 6, and a separator 7 disposed between the positive electrode 5 and the negative electrode 6, which form an electrode assembly 4. The electrode assembly 4 is placed in a battery case 8, and an electrolyte is injected in the battery base 8. The battery case 8 is sealed by a cap plate 11. Embodiments of the present invention are not limited to the rectangular lithium secondary battery of the accompanying drawing, and may include an operable lithium secondary battery in any suitable form, for example, cylindrical, coin, or pouch form.

The electrolyte of the lithium secondary battery 3 may be the electrolyte according to embodiments of the present invention. The electrolyte may be, for example, a liquid electrolyte solution.

The positive electrode 5 includes a current collector and a positive active material layer disposed on the current collector. The positive active layer includes a positive active material, a binder, and, optionally, a conducting agent.

Aluminum (Al) may be used for the current collector, but embodiments of the present invention are not limited thereto. A compound (e.g., a lithiated intercalation compound) which allows reversible intercalation and deintercalation of lithium may be used as the positive active material. The positive active material may be at least one composite oxide of lithium and a metal selected from among cobalt (Co), manganese (Mn), nickel (Ni), iron (Fe), and a combination thereof. Examples of the positive active material include compounds represented by the following formulae: $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as positive active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline.

The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any appropriate (e.g., suitable) method that does not adversely affect physical properties of the positive active material when a compound of the coating element is used. For example, the coating layer may be formed using spray-coating, dipping, or the like, as should be apparent to one of ordinary skill in the art.

The binder strongly binds positive active material particles to each other and to a current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used for providing conductivity to the negative electrode. Any suitable electron conducting material that does not induce a chemical change in batteries may be used. Examples of the conducting agent include natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two of them.

The negative electrode 6 includes a current collector and a negative active material layer on the current collector.

The current collector may be any one selected from among a copper foil, a nickel foil, a stainless steel foil, a titanium foil, a nickel foam, a copper foam, a polymeric substrate coated with a conductive metal, and a combination thereof, but the current collector is not limited thereto.

The negative active material layer includes a negative active material, a binder, and, optionally, a conducting agent.

Examples of the negative active material include a material allowing reversible intercalation and deintercalation of lithium ions, lithium metal, a lithium metal alloy, a material allowing doping or undoping of lithium, and a transition metal oxide.

The material that allows reversible intercalation and deintercalation of lithium ions may be any suitable carbonaceous negative active material, such as those that are commonly used in a lithium secondary battery. Examples of this material include crystalline carbon, amorphous carbon, and combinations thereof. Examples of the crystalline carbon include graphite, such as natural graphite or artificial graphite that are in amorphous, plate, flake, spherical or fibrous form. Examples of the amorphous carbon include soft carbon (carbon sintered at low temperatures), hard carbon, meso-phase pitch carbides, sintered corks, and the like.

The lithium metal alloy may be an alloy of lithium with a metal selected from the group consisting of sodium (Na), potassium (K), rubidium (Rb), cesium (Cs), francium (Fr), beryllium (Be), magnesium (Mg), calcium (Ca), strontium (Sr), silicon (Si), antimoy (Sb), lead (Pb), indium (In), zinc (Zn), barium (Ba), radium (Ra), germanium (Ge), aluminum (Al), and tin (Sn).

Examples of the material that allows doping or undoping of lithium include silicon (Si), SiOx wherein $0 < x < 2$, an Si—Y alloy wherein Y is an alkali metal, an alkali earth metal, a Group 13 to Group 16 element, a transition metal, a rare earth element, and combinations thereof (except for Si), Sn, SnO2, an Sn—Y alloy wherein Y is an alkali metal, an alkali earth metal, a Group 13 to Group 16 element, a transition metal, a rare earth element, and a combination thereof (except for Sn), and combinations of at least one of these materials with SiO2. Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide include vanadium oxide and lithium vanadium oxide.

The binder strongly binds negative active material particles together and to a current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used to provide conductivity to the positive electrode. Any suitable electron conducting material that does not induce a chemical change in batteries may be used. Examples of the conducting agent include carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The positive electrode 5 and the negative electrode 6 may be each manufactured by mixing an active material, a conducting agent, and a binder in a solvent to prepare an active material composition, and coating the active material composition on a current collector.

The method of manufacturing positive electrode or the negative electrode should be apparent to one of ordinary skill in the art, and thus a detailed description thereof will not be provided here. N-methylpyrrolidione may be used as the solvent, but the present embodiments are not limited thereto.

The separator 7 may be a single layer or a multi-layer formed of, for example, polyethylene, polypropylene, polyvinylidene fluoride or a combination thereof.

Hereinafter, one or more embodiments of the present invention will be described in further detail with reference to the following examples. These examples are not intended to limit the purpose or scope of the one or more embodiments of the present invention. Technical descriptions that should be apparent to one of ordinary skill in the art will be omitted here.

Preparation Example 1

Synthesis of Cyclotriphosphazene Compound of Formula 4

1) Preparation of Hexachlorocyclotriphosphazene ("A")

[Reaction Scheme 2]

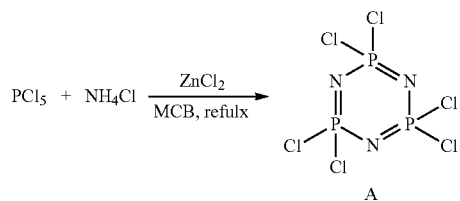

1 eq of phosphorous pentachloride ($PCl_5$), 1.1 eq of ammonium chloride ($NH_4Cl$), 0.015 eq of zinc chloride ($ZnCl_2$), and monochlorobenzene (MCB) were put into a three-neck round-bottomed flask equipped with a reflux condenser, a magnetic stirrer bar, and a temperature controller.

While the reaction mixture was stirred, the reaction temperature was slowly increased to about 130° C. over 3 hours, and then stirred for about 2 hours at the same temperature (130° C.).

After completion of the reaction, the temperature of the reaction mixture was cooled down to room temperature (25° C.), followed by filtration and removing the solvent from the cooled reaction mixture under reduced pressure to obtain a crude product, which was then purified by column chromatography to obtain hexachlorocyclotriphosphazene A.

2) Preparation of Hexafluorocyclotriphosphazene ("B")

[Reaction Scheme 3]

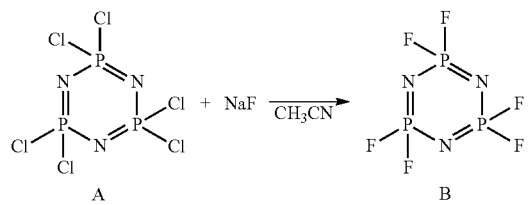

1 eq of hexachlorocyclotriphosphazene (A), 7 eq of sodium fluoride, and acetonitrile were put into a one-neck round-bottomed flask equipped with a magnetic stirrer, and then stirred at room temperature until the reaction was terminated.

After completion of the reaction, the reaction mixture was filtered, and the solvent was removed under reduced pressure. The resulting product was purified by column chromatography to obtain hexafluorocyclotriphosphazene (B).

$^{19}$F-NMR(CDCl$_3$) −68.24, −68.48, −69.82, −70.03;

FT-IR (neat) 120, 1100, 950, 800, 750

3) Preparation of Cyclotriphosphazene Compound of Formula 4

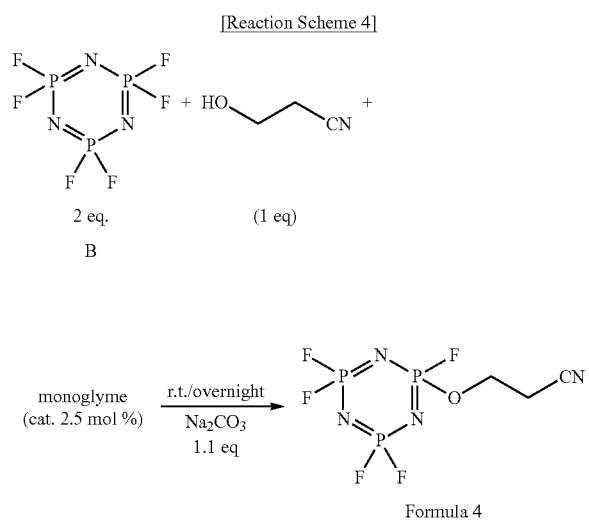

Formula 4

2 eq. of hexafluorocyclotriphosphazene B, 1 eq. of 3-hydroxypropionitrile, 2.5 mol % of monoglyme, 1.1 eq. of sodium carbonate, and diethylether were put into a one-neck round-bottomed flask, and then stirred.

The reaction mixture was stirred overnight at ambient temperature under reflux until the reaction was completed. After completion of the reaction, the reaction mixture was filtered, and the solvent was removed under reduced pressure. The resulting product was purified by flash column chromatography to obtain a cyclotriphosphazene compound of Formula 4. A structure of the cyclotriphosphazene compound of Formula 4 obtained in Preparation Example 1 was identified by nuclear magnetic resonance (NMR) spectroscopy and infrared (IR) spectroscopy.

$^1$H-NMR(CDCl$_3$) 2.85 (2H), 4.05 (2H);

$^{13}$C-NMR(CDCl$_3$) 19.39, 63.11, 115.31;

$^{19}$F-NMR(CDCl$_3$) −65.28, −67.55, −69.17, −69.85, −70.13;

FT-IR (neat) 1500, 1270, 970, 820

Preparation Example 2

Synthesis of Cyclotriphosphazene Compound of Formula 5

[Reaction Scheme 5]

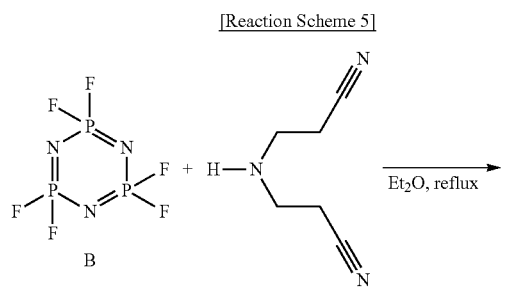

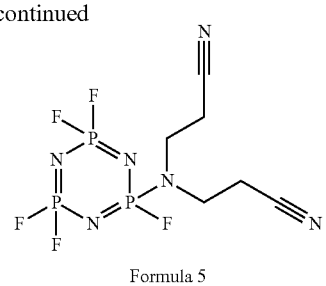

Formula 5

After 1 eq. of hexafluorocyclotriphosphazene (B) of Preparation Example 1 and diethyl ether were put into a three-neck round-bottomed flask equipped with a reflux condenser, a magnetic stirrer bar, and a temperature controller, a solution of 3,3'-iminodipropionitrile (1 eq) in ether was dropwise added thereto over a time period of 1 hour.

The reaction mixture was stirred under reflux until the reaction was completed. After completion of the reaction, the temperature of the reaction mixture was cooled down to room temperature, and the solvent was removed under reduced pressure. The resulting product was purified by column chromatography to obtain the cyclotriphosphazene compound of Formula 5.

A structure of the cyclotriphosphazene compound of Formula 5 obtained in Preparation Example 2 was identified by NMR spectroscopy and IR spectroscopy.

Examples 1-3

Electrolyte Preparation 0.2 parts by weight of LiPF$_6$ and LiBF$_4$ were mixed in a solution of 6 parts by weight of fluoroethylene carbonate (FEC), 0.5 parts by weight of vinylethylene carbonate (VEC), and a mixture of ethylene carbonate (EC), ethylmethylcarbonate (EMC), and diethyl carbonate (DEC) in a weight ratio of 3:5:2 to obtain a 0.9M LiPF$_6$ and LiBF$_4$ solution. 3 Parts by weight of succinonitrile, 2.5 parts by weight of 1,3-propane sultone, and the cyclotriphosphazene compound of Formula 4 obtained in Preparation Example 1 were added to the LiPF$_6$ and LiBF$_4$ solution. Here, the amount of the cyclotriphosphazene compound of Formula 4 obtained in Preparation Example 1 was used (e.g., was added to the LiPF$_6$ and LiBF$_4$ solution) in amounts according to Table 1 below.

Examples 4-6

Electrolyte Preparation

Electrolytes were prepared in the same (or substantially the same) manner as in Examples 1 to 3, except that the cyclotriphosphazene compound of Formula 5 obtained in Preparation Example 2 was used instead of the cyclotriphosphazene compound of Formula 4 obtained in Preparation Example 1.

TABLE 1

| Example | Amount of cyclotriphosphazene compound* (parts by weight) |
|---|---|
| Example 1 | 5 |
| Example 2 | 10 |
| Example 3 | 15 |
| Example 4 | 5 |

TABLE 1-continued

| Example | Amount of cyclotriphosphazene compound* (parts by weight) |
|---|---|
| Example 5 | 10 |
| Example 6 | 15 |

*based on 100 parts by weight of the electrolyte.

Comparative Examples 1-3

Electrolyte Preparation

Electrolytes were prepared in the same (or substantially the same) manner as in Examples 1 to 3, except that a dimethylaminocyclotriphosphazene compound of Formula 9 below was used instead of the cyclotriphosphazene compound of Formula 4.

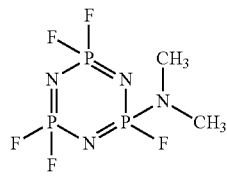

[Formula 9]

Comparative Example 4

Electrolyte Preparation

An electrolyte was prepared in the same (or substantially the same) manner as in Example 1, except that the cyclotriphosphazene compound of Formula 4 was not used.

Comparative Examples 5-7

Electrolyte Preparation

Electrolytes were prepared in the same (or substantially the same) manner as in Comparative Examples 1 to 3, except that 1 part by weight of succinonitrile and 1 part by weight of 1,3-propane sultone were used instead of the 3 parts by weight of succinonitrile and 2.5 parts by weight of 1,3-propane sultone used in Comparative Examples 1 to 3.

Comparative Example 8

Electrolyte Preparation

An electrolyte was prepared in the same (or substantially the same) manner as in Comparative Example 5, except that the dimethylaminocyclotriphosphazene compound of Formula 9 was not used.

Manufacture Example 1

Manufacture of Lithium Secondary Battery

LiCoO$_2$ as a positive electrode active material, polyvinylidene fluoride (PVDF) as a binder, and carbon as a conducting agent were mixed in a weight ratio of 92:4:4, and then N-methyl-2-pyrrolidone was dispersed in the mixture to prepare a positive active material layer composition, which was then coated on an aluminum foil having a thickness of about 20 μm, dried, and roll-pressured to manufacture a positive electrode.

Crystalline artificial graphite as a negative electrode active material and polyvinylidene fluoride (PVDF) as a binder were mixed in a weight ratio of 92:8, and then the resultant was dispersed in N-methyl-2-pyrrolidone to prepare a positive active material layer composition, which was then coated on a copper foil having a thickness of about 15 μm, dried, and roll-pressured to manufacture a negative electrode.

The positive electrode, the negative electrode, and a 25 μm-thick polyethylene separator disposed between the positive and negative electrodes were wound together and compressed to be accommodated into a rectangular can (having dimensions of 51 mm×51 mm×61 mm) and then the electrolyte of Example 1 was injected to the resultant structure to manufacture a lithium secondary battery.

Manufacture Examples 2-6

Manufacture of Lithium Secondary Battery

Lithium secondary batteries were manufactured in the same (or substantially the same) manner as in Manufacture Example 1, except that the electrolytes of Examples 2 to 6 were used instead of the electrolyte of Example 1.

Comparative Manufacture Examples 1-8

Manufacture of Lithium Secondary Battery

Lithium secondary batteries were manufactured in the same (or substantially the same) manner as in Manufacture Example 1, except that the electrolytes of Comparative Examples 1 to 8 were used instead of the electrolyte of Example 1.

Evaluation Example 1

Heat Exposure Test of Lithium Secondary Battery

Three lithium secondary batteries were manufactured according to each of Manufacture Examples 1 to 6 and Comparative Manufacture Examples 1 to 8, and then subjected to a heat exposure test for evaluating safety against heat exposure. In the heat exposure test, the lithium secondary batteries were subjected to ii) rated charging in a standard condition (1025 mA/4.35V, cut-off 102 mA), and then resting for about 10 minutes to about 72 hours. After ii) the cell temperature was increased to 150° C. at a rate of 5° C./min, and then maintained at the same temperature (150° C.) for about 60 minutes, and iii) a peak temperature at which the test cell was durable, an open circuit voltage (OCV) and any apparent defects and appearance of the test cell were observed. The results are shown in Table 2 below.

Evaluation Example 2

Penetration Test of Lithium Secondary Battery

Three lithium secondary batteries were manufactured according to each of Manufacture Examples 1 to 6 and Comparative Manufacture Examples 1 to 8, and then subjected to a penetration test for evaluating safety against penetration. In the penetration test, the lithium secondary batteries were subjected to ii) rated charging in a standard condition (1025 mA/4.35V, cut-off 102 mA), and then resting for about 10 minutes to about 72 hours. After ii) the lithium secondary batteries were completely penetrated through the middle of the cell with a nail (3φ)) at a rate of 150 mm/s, and iii) any apparent defects and appearance of the test cell were observed. The results are shown in Table 2 below.

Safety evaluation criteria in Evaluation Examples 1 and 2 were as follows.

L0: good, L1: leakage, L2: flashes, L3: smoke, L4: fire, L5: bursting.

The figure (e.g., number) preceding the letter "L" indicates the number of cells tested.

TABLE 2

| Example | Heat exposure test | Penetration test |
| --- | --- | --- |
| Manufacture Example 1 | 3L1 | 3L1 |
| Manufacture Example 2 | 3L1 | 3L1 |
| Manufacture Example 3 | 3L1 | 3L1 |
| Manufacture Example 4 | 3L1 | 3L1 |
| Manufacture Example 5 | 3L1 | 3L1 |
| Manufacture Example 6 | 3L1 | 3L1 |
| Comparative Manufacture Example 1 | 3L1 | 3L1 |
| Comparative Manufacture Example 2 | 3L1 | 3L1 |
| Comparative Manufacture Example 3 | 3L1 | 3L1 |
| Comparative Manufacture Example 4 | 2L1, 1L4 | 3L1 |
| Comparative Manufacture Example 5 | 3L4 | N/A |
| Comparative Manufacture Example 6 | 3L4 | 3L1 |
| Comparative Manufacture Example 7 | 3L4 | 3L1 |
| Comparative Manufacture Example 8 | 3L4 | 1L1, 2L4 |

Referring to Table 2, although the results of the heat exposure test and the penetration test appear to be the same (or substantially the same) between the lithium secondary batteries of Manufacture Examples 1 to 6 and the lithium secondary batteries of Comparative Manufacture Examples 1 to 6, the defects in the lithium secondary batteries of Manufacture Examples 1 to 6 from the heat exposure test occurred after those in the lithium secondary batteries of Comparative Manufacture Examples 1 and 3 (e.g., it took a longer period of time for the lithium secondary batteries of Manufacture Examples 1 to 6 to develop the defects than it did for the lithium secondary batteries of Comparative Manufacture Examples 1 to 6 to develop the defects). This indicates that the lithium secondary batteries of Manufacture Examples 1 to 6 have improved safety and resistance to flame, as compared with the lithium secondary batteries of Comparative Manufacture Examples 1 and 3.

The lithium secondary batteries of Manufacture Examples 1 to 6 were found to have improved heat exposure characteristics as compared with the lithium secondary batteries of Comparative Manufacture Examples 1 and 3. As a result of the penetration test, the lithium secondary batteries of Manufacture Examples 1 to 6 were found to have significantly improved safety against penetration, as compared with the lithium secondary batteries of Comparative Manufacture Example 8.

Evaluation Example 3

Half-Penetration Test of Lithium Secondary Battery

Three of the lithium secondary batteries manufactured according to each of Manufacture Examples 1 to 3 and Comparative Manufacture Example 9 were prepared for a half-penetration test. Each of the lithium secondary batteries was charged under standard conditions at a constant current (CC) of about 1025 mA and a constant voltage (CV) of about 4.35V (cut-off current; about 102 mA), followed by a rest period of about 10 minutes or longer to have a charge time within about 72 hours and discharged at a constant current of about 500 mA (cut-off voltage; 3.3V). Then, a center region of each lithium secondary battery was penetrated to a depth of about a half diameter thereof at a rate of about 10 mm/s by a nail having a diameter of about 3φ and evaluated for any apparent defects and nail penetration safety. The results are shown in Table 2 below.

The penetration safety of each lithium secondary battery was evaluated according to the following criteria:

L0—Good, L1—Liquid leakage, L2—Fume (<200° C.), L3—Fume (>200° C.), L4—Fire, and L5—Bursting In Table 3, the figure (e.g., number) preceding the letter "L" indicates the number of tested lithium secondary batteries with a corresponding defect.

TABLE 3

| Example | Half-penetration test |
| --- | --- |
| Manufacture Example 1 | 3L1 |
| Manufacture Example 2 | 3L1 |
| Manufacture Example 3 | 3L1 |
| Comparative Manufacture Example 4 | 2L1, L4 |

Referring to Table 3, as a result of the half-penetration test, the lithium secondary batteries of Manufacture Examples 1 to 3 were found to have improved safety against penetration, compared to the lithium secondary battery of Comparative Manufacture Example 4.

As described above, according to one or more embodiments of the present invention, an electrolyte for lithium secondary batteries has improved resistance to flame and improved stability, and may be used to manufacture a lithium secondary battery with improved charge/discharge characteristics and improved lifetime characteristics.

It should be understood that the exemplary embodiments described therein should be considered in a descriptive sense and not for purposes of limitation. Descriptions of features or aspects within each embodiment should typically be considered as available for other similar features or aspects in other embodiments. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A cyclotriphosphazene compound comprising a fluorinated cyclotriphosphazene compound having at least one fluorine atom substituted with a group represented by Formula 1:

*A-[B—CN]$_x$    [Formula 1]

A being a heteroatom having an unshared electron pair;

\* representing a binding site for bonding the group represented by Formula 1 to a phosphorus (P) atom of the fluorinated cyclotriphosphazene compound;

B being a substituted or unsubstituted C1-C5 alkylene group; and x being 1 or 2.

2. The cyclotriphosphazene compound of claim 1, wherein the group represented by Formula 1 is represented by Formula 1a or 1b:

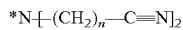

*N—[(CH$_2$)$_n$—C≡N]$_2$    [Formula 1a]

wherein, in Formula 1a, n is an integer in a range of 1 to 5,

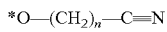   [Formula 1b]

wherein, in Formula 1 b, n is an integer in a range of 1 to 5, and wherein * in Formulae 1a and 1b represents a binding site for bonding the group represented by Formulae 1a or 1b to a phosphorous (P) atom of the fluorinated cyclotriphosphazene compound.

3. The cyclotriphosphazene compound of claim 1, wherein the cyclotriphosphazene compound is a compound represented by Formula 2 or a compound represented by Formula 3:

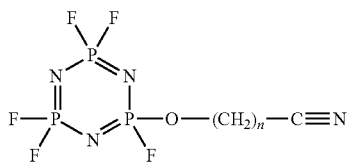   [Formula 2]

wherein, in Formula 2, n is an integer in a range of 1 to 5,

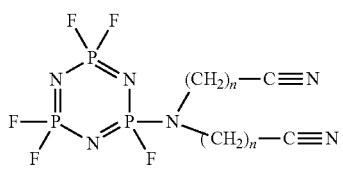   [Formula 3]

wherein, in Formula 3, n is an integer in a range of 1 to 5.

4. The cyclotriphosphazene compound of claim 3, wherein n in Formula 2 is 1, 2, 3, or 4, and n in Formula 3 is 1 or 2.

5. The cyclotriphosphazene compound of claim 1, wherein the cyclotriphosphazene compound is a compound represented by Formula 4 or a compound represented by Formula 5:

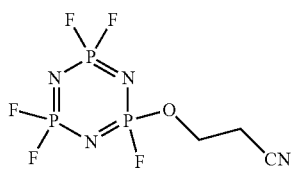   [Formula 4]

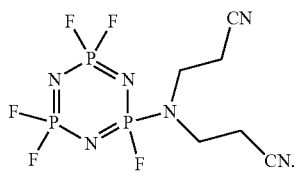   [Formula 5]

6. An electrolyte for lithium secondary batteries, comprising:

a lithium salt;

a nonaqueous organic solvent; and the cyclotriphosphazene compound of claim 1.

7. The electrolyte of claim 6, wherein an amount of the cyclotriphosphazene compound is in a range of about 0.5 parts to about 10 parts by weight based on 100 parts by weight of a total weight of the electrolyte.

8. The electrolyte of claim 6, wherein the lithium salt is $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$, or a combination thereof, where x and y are natural numbers.

9. A lithium secondary battery comprising;

a positive electrode;

a negative electrode; and the electrolyte of claim 6.

10. The lithium secondary battery of claim 9, wherein an amount of the cyclotriphosphazene compound is in a range of about 0.5 parts to about 10 parts by weight based on 100 parts by weight of a total weight of the electrolyte.

11. The lithium secondary battery of claim 9, wherein the lithium salt is $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$, or a combination thereof, where x and y are natural numbers.

12. A method of preparing the cyclotriphosphazene compound of claim 1, the method comprising reacting a compound represented by Formula 6 and hexafluorocyclotriphosphazene, AH—[B—CN]$_x$,   [Formula 6]

A being a heteroatom having an unshared electron pair;

B being a substituted or unsubstituted C1-C5 alkylene group; and x being 1 or 2.

13. The method of claim 12, wherein the compound of Formula 6 is a compound represented by Formula 7 or a compound represented by Formula 8:

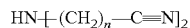   [Formula 7]

wherein, in Formula 7, n is an integer in a range of 1 to 5, and

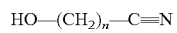   [Formula 8]

wherein, in Formula 8, n is an integer in a range of 1 to 5.

14. The method of claim 12, wherein the hexafluorocyclotriphosphazene is a reaction product of hexachlorocyclotriphosphazene and sodium fluoride.

15. The method of claim 14, wherein the hexachlorocyclotriphosphazene is a reaction product of ammonium chloride and phosphorous pentachloride.

16. A cyclotriphosphazene compound comprising a compound represented by Formula 10:

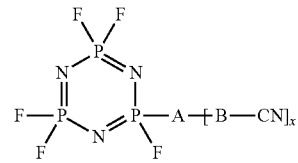   [Formula 10]

A being a heteroatom having an unshared electron pair;

B being a substituted or unsubstituted C1-C5 alkylene group; and x being 1 or 2.

* * * * *